United States Patent
Beres et al.

(10) Patent No.: US 12,122,464 B2
(45) Date of Patent: Oct. 22, 2024

(54) MOTOR VEHICLE STEERING SYSTEM WITH A CONTROL UNIT OF REDUNDANT CONFIGURATION

(71) Applicants: thyssenkrupp Presta AG, Eschen (LI); thyssenkrupp AG, Essen (DE)

(72) Inventors: Adela Beres, Budapest (HU); Gergely Horvath, Fülöpszállás (HU); Gergely Füzes, Budapest (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 975 days.

(21) Appl. No.: 17/252,448

(22) PCT Filed: Jun. 18, 2019

(86) PCT No.: PCT/EP2019/065948
§ 371 (c)(1),
(2) Date: Dec. 15, 2020

(87) PCT Pub. No.: WO2019/243294
PCT Pub. Date: Dec. 26, 2019

(65) Prior Publication Data
US 2021/0276613 A1    Sep. 9, 2021

(30) Foreign Application Priority Data
Jun. 20, 2018 (DE) .................... 10 2018 114 828.3

(51) Int. Cl.
*B62D 5/04* (2006.01)
*B62D 5/00* (2006.01)
(Continued)

(52) U.S. Cl.
CPC .......... *B62D 5/0484* (2013.01); *B62D 5/003* (2013.01); *B62D 5/0463* (2013.01); *H02P 25/22* (2013.01); *H02P 29/028* (2013.01)

(58) Field of Classification Search
None
See application file for complete search history.

(56) References Cited

U.S. PATENT DOCUMENTS

| 6,448,738 B1 * | 9/2002 | Burton | H02P 21/22 318/807 |
| 7,586,768 B2 * | 9/2009 | Yoshimoto | B60L 58/30 363/71 |

(Continued)

FOREIGN PATENT DOCUMENTS

| CN | 105409094 A | 3/2016 |
| CN | 107406098 A | 11/2017 |

(Continued)

OTHER PUBLICATIONS

English Translation of International Search Report issued in PCT/EP2019/065948, dated Sep. 17, 2019.

*Primary Examiner* — Justin S Lee
(74) *Attorney, Agent, or Firm* — thyssenkrupp North America , LLC

(57) ABSTRACT

The invention relates to a redundant control device (5) for a three-phase electric motor (1) of a steering system of a motor vehicle, having a primary control path (6) and a secondary control path (7), wherein the primary control path (6) has a primary processing unit (10), and the secondary control path (7) has a secondary processing unit (11), wherein the primary control path (6) is connected to a first phase winding of the electric motor, and the secondary control path (7) is connected to a second phase winding and a third phase winding for actuating the electric motor, wherein each phase winding is assigned an individual converter (12,13,14).

19 Claims, 1 Drawing Sheet

(51) Int. Cl.
*H02P 25/22* (2006.01)
*H02P 29/028* (2016.01)

(56) References Cited

U.S. PATENT DOCUMENTS

| | | | |
|---|---|---|---|
| 11,305,783 B2* | 4/2022 | Nakada | H04L 12/40 |
| 11,565,745 B2* | 1/2023 | Kuehnhoefer | B62D 5/0484 |
| 2011/0166750 A1* | 7/2011 | Nakano | H02P 21/0089 |
| | | | 701/41 |
| 2012/0249044 A1* | 10/2012 | Linda | B60L 15/10 |
| | | | 318/722 |
| 2013/0077194 A1* | 3/2013 | Hasan | H02P 21/22 |
| | | | 361/87 |
| 2013/0090813 A1 | 4/2013 | Kanekawa | |
| 2014/0229074 A1 | 8/2014 | Kanekawa | |
| 2014/0265942 A1* | 9/2014 | Li | B60L 15/007 |
| | | | 318/51 |
| 2015/0365021 A1* | 12/2015 | Schierling | B60L 7/14 |
| | | | 318/376 |
| 2016/0094180 A1* | 3/2016 | Ajima | B62D 5/065 |
| | | | 318/504 |
| 2016/0134212 A1 | 5/2016 | Kikuchi et al. | |
| 2016/0181876 A1 | 6/2016 | Kawasaki et al. | |
| 2016/0325777 A1* | 11/2016 | Mori | H02P 6/085 |
| 2016/0339949 A1 | 11/2016 | Mori | |
| 2017/0166248 A1 | 6/2017 | Asao et al. | |
| 2017/0282966 A1 | 10/2017 | Fukuda et al. | |
| 2018/0102719 A1* | 4/2018 | Oka | H02P 27/085 |
| 2018/0127023 A1 | 5/2018 | Fuzes et al. | |
| 2018/0334184 A1* | 11/2018 | Jin | B62D 5/0469 |
| 2020/0198687 A1* | 6/2020 | Steck | H02K 5/10 |
| 2020/0212767 A1* | 7/2020 | Yatsugi | H01L 23/3121 |
| 2022/0224275 A1* | 7/2022 | Nakamura | H02P 29/024 |

FOREIGN PATENT DOCUMENTS

| | | | | |
|---|---|---|---|---|
| DE | 10 2012 101 006 A | | 8/2013 | |
| DE | 10 2015 104 850 A | | 10/2016 | |
| EP | 1468900 A2 | * | 10/2004 | B62D 5/006 |
| EP | 2 583 879 A | | 4/2013 | |
| EP | 3 082 253 A | | 10/2016 | |
| EP | 3 113 355 A | | 1/2017 | |
| EP | 3 163 745 A | | 5/2017 | |
| EP | 3319864 A1 | | 5/2018 | |
| JP | 2016010270 A | | 1/2016 | |
| KR | 20180012391 A | * | 2/2018 | H02M 3/158 |
| WO | WO-2013013792 A2 | * | 1/2013 | H02H 7/122 |
| WO | 2014203300 A1 | | 12/2014 | |
| WO | 2017/005320 A1 | | 1/2017 | |
| WO | 2018/016541 A | | 1/2018 | |

* cited by examiner

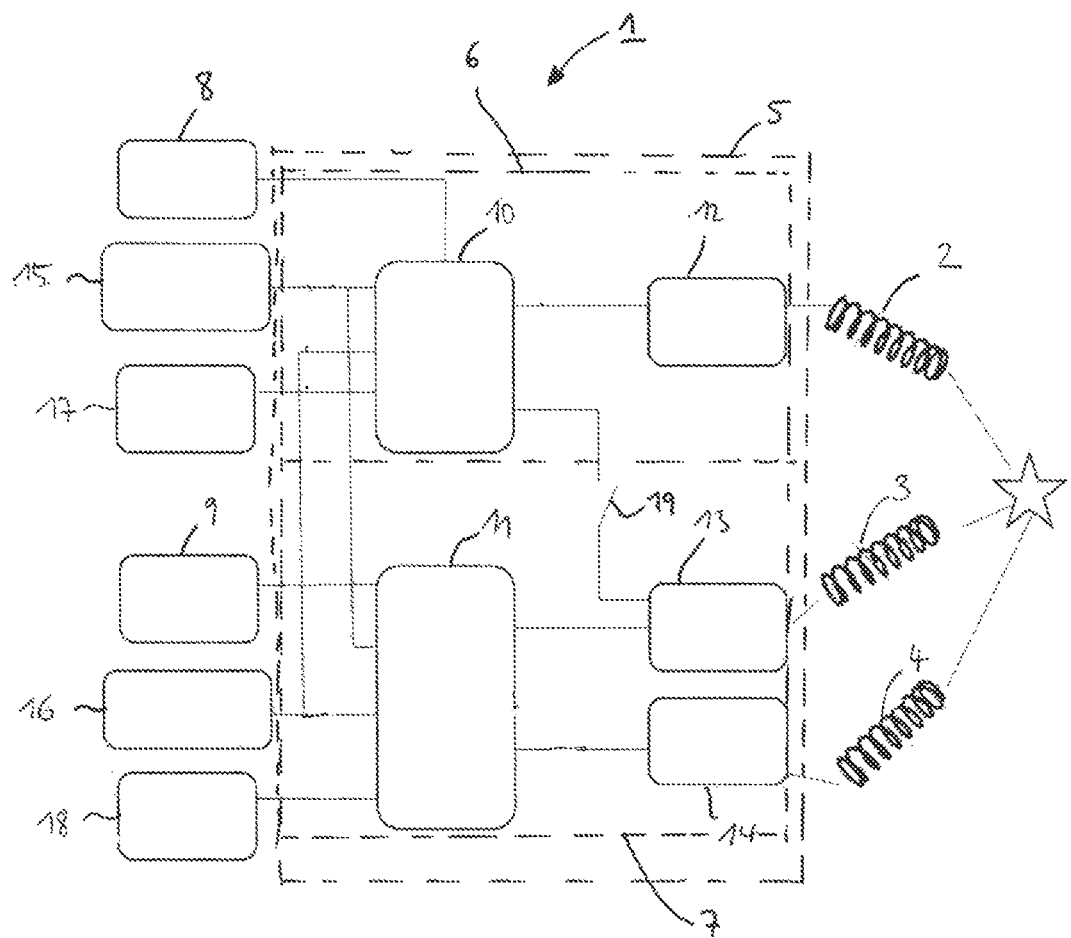

MOTOR VEHICLE STEERING SYSTEM WITH A CONTROL UNIT OF REDUNDANT CONFIGURATION

CROSS REFERENCE TO RELATED APPLICATIONS

This application is a U.S. National Stage Entry of International Patent Application Serial Number PCT/EP2019/065948, filed Jun. 18, 2019, which claims priority to German Patent Application No. DE 10 2018 114 828.3, filed Jun. 20, 2018, the entire contents of both of which are incorporated herein by reference.

FIELD

The present disclosure generally relates to a motor vehicle steering system.

BACKGROUND

Currently available EPS systems are configured in a "fail-silent" fashion, i.e. when a malfunction is detected (either in the data processing system or the power electronics) the assistance from the power steering system is switched off in order to avoid an undesired state such as, for example, locking of the steering wheel. In steer-by-wire steering systems it is also known to switch off the steering actuator in the event of a fault and to have recourse to a fallback level. This approach is not suitable for autonomous driving. In an autonomous driving mode, the motor vehicle can sense the surroundings of the motor vehicle using various sensors of the driver assistance system and can control the motor vehicle completely automatically by specifying predetermined values. For autonomous driving, for example the Automotive Safety Integrity Level (ASIL) quality criterion is prescribed, said criterion ensuring a specific level of fail safety or of availability of the steering system. Redundant concepts are proposed in order to allow for these more stringent safety requirements for autonomous driving.

The laid-open German patent application DE 10 2015 104 850 A1 discloses a redundant concept with a first part drive having a first electronic actuation system, a first intermediate circuit, a first power output stage and a first winding group of a motor and a second part drive with a second electronic actuation system, a second intermediate circuit, a second power output stage and a second winding group of the motor, wherein there is galvanic separation between the first and second electronic actuation systems, the first and second intermediate circuits, the first and second power output stages and the first and second winding groups. Galvanic separation ensures the highest possible degree of independence of the individual drives. This ensures that a defect cannot propagate in a plurality of part drives of a redundant drive and therefore bring about a total failure of the functional capability of the electrical steering system despite redundancy.

Thus, a need exists for a redundant control device for actuating an electric motor for a steering system of a motor vehicle.

BRIEF DESCRIPTION OF THE FIGURE

FIG. 1 is a schematic block diagram of an electric motor of a motor vehicle power steering system.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to a control device for a steering system of a motor vehicle, to an electromechanical steering system and to a steer-by-wire steering system for a motor vehicle, as well as to a method for providing a torque for a steering system of a motor vehicle.

Accordingly, a redundant control device for a three-phase electric motor of a steering system of a motor vehicle having a primary control path and a secondary control path is provided, wherein the primary control path has a primary processing unit, and the secondary control path has a secondary processing unit, and wherein the primary control path is connected to a first phase winding of the electric motor, and the secondary control path is connected to a second and a third phase winding of the electric motor for actuating the electric motor, wherein each phase winding is assigned an individual converter.

The control device according to the invention constitutes a robust drive concept since in the event of a fault in one of the control paths, the fault-free control path performs the actuation of the assigned phase windings, and therefore at least one third of the maximum available motor torque is available, and this is sufficient to perform a safety steering maneuver.

The primary processing unit is preferably configured to calculate the setpoint motor torque on the basis of the torque input into the steering wheel by the driver and further input variables, and to determine, by means of a primary motor regulating means on the basis of the setpoint motor torque, primary motor currents for operating the first phase winding and to pass them on to the primary converter It is also preferred if the secondary processing unit is configured to calculate a setpoint motor torque on the basis of the torque input into the steering wheel by the driver and further input variables, and to determine, by means of a secondary motor regulating means on the basis of the setpoint motor torque, secondary motor currents for operating the second and third phase windings and to pass them on to two secondary converters.

In this context, the further input variables preferably comprise at least one of the following variables: vehicle velocity, instantaneous rotor position measured by means of a rotor position sensor, and measured current values in the phase windings.

In a preferred embodiment, the signals of the primary and secondary rotor position sensors and/or the primary and secondary torque sensor units are respectively made available both to the primary processing unit and to the secondary processing unit. This can increase the redundancy.

Furthermore, it may be advantageous if the primary control path is connected to a primary motor vehicle bus, and the secondary control path is connected to a secondary motor vehicle bus which is separate from the primary motor vehicle bus. This also further increases the redundancy of the control paths.

The primary control path and the secondary control path preferably each have an external power supply for increasing the redundancy.

There is preferably provision that the primary and secondary processing unit is an MCU.

In one advantageous embodiment, the secondary processing unit is embodied as a main processing unit, which in the fault-free state of the control device is configured to calculate the setpoint motor torques and their distribution along the three converters in order to actuate the three phase windings. This has the advantage that as a result the primary processing unit can be made smaller and therefore more cost-effective.

It is possible to provide a switch which is arranged between the primary processing unit and one of the secondary converters and which is configured to connect the primary processing unit to the secondary converter in the event of a fault in the secondary control path. As a result, the power of the electric motor can be increased in the case of a fault.

Furthermore, an electromechanical steering system for a motor vehicle is provided, having
- a steering pinion which is connected to a lower steering shaft and is in engagement with a toothed rack, mounted so as to be displaceable along a longitudinal axis in a housing, in order to steer wheels,
- a three-phase electric motor for providing power steering,
- two torque sensors which are arranged between an upper steering shaft, connected to the steering wheel, and the lower steering shaft, and which sense a torque input by the driver, and
- an electronic control unit for calculating the power steering assistance by means of the three-phase electric motor, which comprises a redundant control device as previously described.

In addition, a steer-by-wire steering system for motor vehicles is provided, having a steering actuator which works on the steered wheels, is electronically regulated as a function of the driver's steering request and acts on the steered wheels by means of a steering gear, having a feedback actuator which transmits reactions of the road to a steering wheel, wherein the steering actuator comprises a redundant control device as previously described.

A method for providing a torque for a steering system of a motor vehicle, having a three-phase electric motor and an electronic control unit for calculating the torque which is to be applied by the electric motor, is also provided, wherein the electronic control unit comprises a redundant control device with a primary control path and a secondary control path, and the primary control path has a primary processing unit, and the secondary control path has a secondary processing unit, and the primary control path is connected to a first phase winding of the electric motor, and the secondary control path is connected to a second and a third phase winding for actuating the electric motor, wherein each phase winding is assigned an individual converter, and the method has the following steps:
- calculating the setpoint motor torques for actuating all the three phase windings in the secondary processing unit,
- passing on the setpoint motor torques to a primary motor regulating means of the primary processing unit,
- determining primary motor currents for operating the first phase winding in the primary motor regulating means,
- determining secondary motor currents for operating the second and third phase windings in a secondary motor regulating means of the secondary processing unit,
- detecting a fault state in one of the control paths, and
- switching off the power steering assistance of the faulty control path.

The method preferably has the following further steps:
- detecting a fault in the secondary control path,
- calculating the setpoint motor torque for actuating the primary phase windings in the primary processing unit.

The secondary processing unit preferably calculates the setpoint motor torques on the basis of the torque input into the steering wheel by the driver and further input variables.

The further input variables preferably comprise here at least one of the following variables: vehicle velocity, instantaneous rotor position measured by means of a rotor position sensor, measured current values in the phase winding.

In order to increase the redundancy, the signals of the primary and secondary rotor position sensors and/or of the primary and secondary torque sensor units are preferably each available both to the primary processing unit and to the secondary processing unit.

The primary control path preferably receives data from a primary motor vehicle bus and the secondary control path receives data from a secondary motor vehicle bus which is separate from the primary motor vehicle bus, in order to increase the redundancy of the two paths.

There can also be provision that the primary control path and the secondary control path are each connected to an external power supply.

The primary and secondary processing unit is preferably an MCU.

An exemplary embodiment of the present invention is described below with reference to the drawing. FIG. 1 shows a schematic block diagram of an electric motor 1 of a motor vehicle power steering system. The electric motor 1 has three phase windings 2,3,4 and a permanent magnet rotor. The phase windings 2,3,4 of the electric motor are actuated by a control unit. The control unit comprises a control device 5 (ECU). The control device 5 is of redundant configuration and has a primary control path 6 and a secondary control path 7. The primary control path 6 and the secondary control path 7 each preferably have a power supply 8,9, a processing unit 10,11, at least one converter 12,13,14 and the necessary sensors 15,16 (torque, phase current and rotor position). In this context, the modules of the primary control path 6 are referred to below as "primary" modules, and the modules of the secondary control path 7 are referred to as "secondary" modules. The terms "primary" and "secondary" are not necessarily to be understood as meaning that there is a weighting between the modules. The modules may either be identical or different in design.

The primary control path 6 energizes an individual phase winding 2, and the secondary control path 7 energizes two of the three phase windings 3,4. In total, three converters 12,13,14 are provided, which each excite one of the three phase windings 2,3,4 and are actuated in accordance with their assignment to the phases of the primary processing unit 10 or secondary processing unit 11. The voltage converters 12,13,14 preferably each have a direct voltage intermediate circuit in each of which an intermediate circuit capacitor is provided to stabilize the direct voltage, in order to avoid commonly caused failures, e.g. as a result of a short circuit of a capacitor.

Each control path 6,7 has the external power supply 8,9, preferably a battery. The primary and secondary processing unit 10,11 is preferably a microcontroller (MCU). The primary and secondary processing units 10,11 receive the torque which is input into the steering wheel by the driver and has been respectively measured by an assigned primary torque sensor unit 15 and a secondary torque sensor unit 16. Furthermore, the primary and secondary processing units 10,11 are each connected to a separate motor vehicle bus 17,18 via which the processing unit 10,11 receives data signals. The primary and secondary processing units 10,11 calculate the respective setpoint motor torque on the basis of the torque 15,16 input into the steering wheel by the driver and further input variables such as, for example, the vehicle velocity v sent via the respective motor vehicle bus 17,18, and measurement signals from the electric motor such as, for example, the instantaneous rotor position measured by means of the primary and secondary rotor position sensors 15,16 and/or measured current values in the phase windings. The setpoint motor torque is calculated here by means of an algorithm which comprises what is referred to as a boost curve or a steering column torque control algorithm (referred to as column torque control algorithm), for example. The primary motor setpoint torque is passed on to a primary motor regulating means of the primary processing unit 10, which determines the primary motor currents therefrom by means of PWM. The secondary setpoint motor torque is correspondingly passed on to a secondary motor regulating means of the secondary processing unit 11, which determines the secondary motor currents therefrom by means of pulse width modulation (PWM). The primary control path 6 is assigned a primary converter 12 which is actuated in a pulse-width-modulated fashion by means of the primary motor current. In contrast, the secondary control path 7 has two secondary converters 13,14 which are each actuated in the pulse-width modulated fashion by means of the secondary motor currents. The converters 12,13,14 are generally composed of semiconductor-based switches which are connected using the necessary topology. The most frequently used electronic switches are bipolar transistors with an insulated control electrode (referred to as Insulated Gate Bipolar Transistor (IGBT)) or Metal Oxide Semiconductor Field Effect Transistors (MOSFET). These semiconductor switches are actuated by means of what are referred to as Gate-Driver Units (GDU). Since the converters 12,13,14 are each assigned to a phase winding of the electric motor 2,3,4, a first phase winding 2 is energized with the primary motor current by means of the primary converter 12, and the second and third phase windings 3,4 are each energized with the secondary motor current by means of the corresponding secondary converter 13,14, which results in a common torque of the electric motor. This torque is available to the driver in electromechanical steering systems as a power steering assistance or for steering in steer-by-wire steering systems.

The signals of the primary and secondary rotor position sensors 15,16 and of the primary and secondary torque sensor units 15,16 are each available both to the primary and also secondary processing unit 10,11.

The signals of the two primary, and correspondingly the two secondary, sensors 15,16 are compared in order to improve safety, and checked for faults in the sensor pair 15,16. The result of the comparison can also be compared with the respective other sensor pair 15,16. If a critical deviation of the measured signals is detected, the signal input of the faulty signal pair 15,16 is rejected, and the signals of the fault-free sensor pair 15,16 are used exclusively as the input signal for the two processing units 10,11.

In order to increase the sensor accuracy, in the fault-free state the mean value of the measured sensor values can be calculated for use in the primary and secondary processing units 10,11.

Since both sensor pairs 15,16 are respectively connected to the primary and secondary processing units 10,11, in the case of a fault one of the sensor pairs 15,16 is also available for the control unit, wherein 100% of the rated power of the electric motor can be achieved by means of the fault-free sensor pair 15,16.

Both control paths 6,7 are each configured as "fail-silent", i.e. each control path can detect a malfunction or a fault state in itself and switch off the generation of torque by means of the corresponding phase winding or windings. This is typically achieved by a combination of an ASIL-D microcontroller with different plausibility tests and hardware architecture which is capable of disconnecting the phase windings from the control device in the case of a fault (e.g. by means of phase relays).

The two control paths 6,7 are configured in such a way that the two control paths 6,7 are at least independent of one another to the extent that a fault in one hardware component of a control path does not bring about a fault cascade in the hardware component in the other control path, wherein the disconnection of the two control paths can be effected, for example, by means of permanently assigned power lines and ground lines, insulation of control paths and the like. The software of the control paths is configured in such a way that it detects faults both in the hardware and in the software itself within a control path and brings about an interruption or deactivation of the faulty path. In this case, the software is programmed in such a way that the fault-free control path can provide a torque.

In one preferred embodiment there is provision that the secondary processing unit 11 functions as a main processing unit and in the fault-free state calculates the setpoint motor torques and their distribution among the three converters 12,13,14 for actuating the three phase windings 2,3,4. The distribution is carried out in accordance with the capacities which are available by means of the converters 12,13,14 and which are dependent, for example, on the temperature. The secondary processing units 11 preferably actuate two converters 13,14 and the primary processing unit 10 a single converter 12.

Since the control paths 6,7 are of redundant configuration, the control device can provide a torque even in the event of a malfunction of one of the hardware components.

In the event of a primary processing unit 10 failing, two thirds of the nominal torque are available. If, on the other hand, a fault occurs in the primary control path 6 which is not detected, up to a third of the maximum torque can be present as a passive locking torque which counteracts the torque which is generated by the two converters 13,14 which are functioning without faults, so that overall at least one third of the nominal torque is available. Faults in the primary control path 6 are therefore evaluated as multiple faults (referred to as multiple point faults) since a dangerous failure of the control unit can only occur as a result of an additional fault.

If a fault occurs in the secondary control path 7, it must, on the other hand, be detected because, on the one hand, the secondary control path 7 performs, on the one hand, the calculation of the setpoint motor torques and their distribution among the phase windings and, on the other hand, the secondary control path 7 provides two thirds of the torque.

If such a fault is detected, the primary processing unit 10 performs the calculation of the motor current for the primary converter 12 for actuating the corresponding phase winding 2 with a third of the maximum available motor torque.

In the event of a third of the torque not being sufficient to achieve a required torque, a switch 19 is provided which is arranged between a primary processing unit 10 and one of the secondary units 13 and which therefore, in the event of a fault, assigns one of the secondary converters 13 of the primary processing unit 10. This secondary converter 13 can then be actuated by the primary processing unit 10 in the event of a fault in the secondary control path 7, so that the phase winding 3 which is assigned to the converter 13 can be energized, with the result that even in this fault situation two thirds of the nominal torque are available.

The architecture of the control device 5 is constructed in such a way that a first fault does not bring about a failure of the steering system and endanger the driver. This first fault must, however, be considered in the safety analysis. Faults which occur are therefore read out and their presence communicated to the vehicle and/or signaled to the driver so that an emergency maneuver can be initiated. Although the vehicle continues to be controllable after the first fault in the control device 5, a further fault would have serious consequences. Therefore, a first fault must not be categorized as latent.

A quantitative inductive safety analysis in the form of an FMEDA (Failure Mode Effect and Diagnostic Analysis) is produced and used to evaluate and compare the safety concept of a vehicle system. Results provided by an FMEDA are key indicators relating to the diagnosis coverage (DC), to the proportion of safe faults (Safe Failure Fraction, SFF), relating to hardware architecture metrics (Single-Point Fault Metric, SPFM, Latent Fault Metric, LFM) and relating to the fault probability, that a safety objective is infringed (Probabilistic Metric for random Hardware Failure, PMHF).

If the power of the electric motor is correctly configured and the system assumptions are correct, it is therefore possible to categorize all the faults in the electric motor as multiple faults, as a result of which a higher safety level is achieved.

The two external power supplies are preferably independent of one another and each supply a sensor pair and a corresponding processing unit with current. In order to avoid a common failure (short circuit) on the part of the actuator, the primary converter 12 is connected to the primary power supply 8, and the secondary converters 13,14 are connected to the secondary power supply 9. In the event of a power supply 8,9 being faulty, the part of the actuator which has the purpose of generating torque and is energized by the other power supply 8,9 is available, i.e. in the worst case only a third of the maximum motor power is available. If this is not sufficient, it is possible to provide in an additional circuit a switch which connects one of the two converters of the secondary control path 13,14 to the primary power supply 8 in the event of a fault in the secondary control path 7, analogously to the additional switch 19, described above, for connecting the primary processing unit 10 to one of the secondary converters 13.

The described control device can also be used in a steering system of a completely autonomous driving motor vehicle without steering means. However, in this case torques which are measured at the steering wheel are not input into the processing units 10,11 for the calculation of the respective setpoint motor torques. The setpoint motor torques are determined on the basis of signals which are received via the motor vehicle bus 17,18 and have predefined interface specifications, e.g. setpoint steering angle, transmission movement, pinion angle, setpoint torque, setpoint vehicle trajectory in relative or absolute vehicle coordinates. In this context, preferably two independent communication channels are provided for the control loop of the control device, said channels each being assigned to a processing unit and communicating the necessary control signals. In the event of one of the communication channels having a fault, the corresponding control path is deactivated and the fault-free control path actuates the motor with a reduced maximum possible motor torque.

The generally described redundant architecture of the control device achieves a failure rate which is less than 10 FIT (Failure in Time). The failure rate is a characteristic variable of the reliability of the hardware element. In this case it indicates that an average of fewer than 10 control devices faults in 109 operating hours. The control device according to the invention is therefore suitable, in particular, for SAE L3-L5 driving modes, in which the system controls the surroundings and automation which is implemented from a limited to a complete extent is available.

What is claimed is:

1. A redundant control device for a three-phase electric motor of a steering system of a motor vehicle, comprising:
   a primary control path comprising a primary processing unit, and
   a secondary control path comprising a secondary processing unit,
   wherein the primary control path is connected to a first phase winding of the electric motor, and the secondary control path is connected to a second and a third phase winding of the electric motor for actuating the electric motor, and
   wherein each phase winding is assigned an individual converter;
   wherein the secondary processing unit is configured to calculate a setpoint motor torque on the basis of a torque input into a steering wheel and further input variables, and to determine, by means of a secondary motor regulating means on the basis of the setpoint motor torque, secondary motor currents for operating the second and third phase windings and to pass them on to two secondary converters of the individual converters;
   wherein a switch is arranged between the primary processing unit and one of the secondary converters and the switch is configured to connect the primary processing unit to the secondary converter in the event of a fault in the secondary control path.

2. The redundant control device as claimed in claim 1 wherein the primary processing unit is configured to calculate a setpoint motor torque on the basis of a torque input into a steering wheel and further input variables, and to determine, by means of a primary motor regulating means on the basis of the setpoint motor torque, primary motor currents for operating the first phase winding and to pass them on to a primary converter of the individual converters.

3. The redundant control device of claim 2 wherein the further input variables comprise at least one of the following variables: vehicle velocity, instantaneous rotor position measured by means of a first rotor position sensor, and measured current values in the phase windings.

4. The redundant control device of claim 1 wherein the further input variables comprise at least one of the following variables: vehicle velocity, instantaneous rotor position measured by a rotor position sensor, and measured current values in the phase windings.

5. The redundant control device of claim 4 wherein signals from them rotor position sensor are made available both to the primary processing unit and to the secondary processing unit.

6. The redundant control device of claim 1 wherein the primary control path is connected to a primary motor vehicle bus, and the secondary control path is connected to a secondary motor vehicle bus which is separate from the primary motor vehicle bus.

7. The redundant control device of claim 1 wherein the primary control path and the secondary control path each have an external power supply.

8. The redundant control device of claim 1 wherein the primary processing unit is a primary microcontroller (MCU) and the secondary processing unit is a secondary microcontroller (MCU).

9. The redundant control device of claim 1 wherein the secondary processing unit is a main processing unit, and in a fault-free state of the control device is configured to calculate setpoint motor torques and their distribution along the three converters in order to actuate the three phase windings.

10. An electromechanical steering system for a motor vehicle, comprising:
  a steering pinion connected to a lower steering shaft and is in engagement with a toothed rack, mounted so as to be displaceable along a longitudinal axis in a housing, in order to steer wheels of the motor vehicle,
  a three-phase electric motor configured to provide power steering assistance,
  two torque sensors which are arranged between an upper steering shaft, connected to a steering wheel, and the lower steering shaft, and which are configured to sense a torque input, and
  an electronic control unit for calculating the power steering assistance, which comprises a redundant control device, the control device comprising:
    a primary control path and a secondary control path,
    wherein the primary control path has a primary processing unit, and the secondary control path has a secondary processing unit,
    wherein the primary control path is connected to a first phase winding of the electric motor, and the secondary control path is connected to a second and a third phase winding of the electric motor for actuating the electric motor, and
    wherein each phase winding is assigned an individual converter,
    wherein the secondary processing unit is configured to calculate a setpoint motor torque on the basis of a torque input into a steering wheel and further input variables, and to determine, by means of a secondary motor regulating means on the basis of the setpoint motor torque, secondary motor currents for operating the second and third phase windings and to pass them on to two secondary converters of the individual converters;
    wherein a switch is arranged between the primary processing unit and one of the secondary converters and the switch is configured to connect the primary processing unit to the secondary converter in the event of a fault in the secondary control path.

11. A steer-by-wire steering system for motor vehicles having a steering actuator which works on steered wheels of the motor vehicle, the steering actuator configured to be electronically regulated as a function of a steering request and configured to act on the steered wheels by means of a steering gear, and a feedback actuator which is configured to transmit reactions of a road to a steering wheel, wherein the steering actuator is in communication with the redundant control device of claim 1.

12. A method for providing a torque for a steering system of a motor vehicle, comprising a three-phase electric motor and an electronic control unit for calculating torque which is to be applied by the electric motor, wherein the electronic control unit comprises a redundant control device comprising a primary control path and a secondary control path, wherein the primary control path has a primary processing unit, and the secondary control path has a secondary processing unit, wherein the primary control path is connected to a first phase winding of the electric motor, and the secondary control path is connected to a second and a third phase winding of the electric motor for actuating the electric motor, and wherein each phase winding is assigned an individual converter, wherein the secondary processing unit is configured to calculate a setpoint motor torque on the basis of a torque input into a steering wheel and further input variables, and to determine, by means of a secondary motor regulating means on the basis of the setpoint motor torque, secondary motor currents for operating the second and third phase windings and to pass them on to two secondary converters of the individual converters, and wherein a switch is arranged between the primary processing unit and one of the secondary converters and the switch is configured to connect the primary processing unit to the secondary converter in the event of a fault in the secondary control path, the method comprising:
  calculating, via the secondary processing unit, setpoint motor torques for actuating all the three phase windings,
  passing on the calculated setpoint motor torques to a primary motor regulating means of the primary processing unit,
  determining primary motor currents to operate the first phase winding in the primary motor regulating means,
  determining secondary motor currents to operate the second and third phase windings in a secondary motor regulating means of the secondary processing unit, and
  switching off, when a fault state is detected in one of the control paths, a power steering assistance of the control path with the detected fault state.

13. The method of claim 12 further comprising:
  detecting a fault in the secondary control path, and
  calculating a setpoint motor torque for actuating the primary phase windings in the primary processing unit.

14. The method of claim 12 wherein the secondary processing unit calculates the setpoint motor torques on the basis of a torque input into a steering wheel and further input variables.

15. The method of claim 14 wherein the further input variables comprise at least one of the following: vehicle velocity, instantaneous rotor position measured by means of rotor position sensors, and measured current values in the phase windings.

16. The method of claim 15 wherein signals from the rotor position sensors are available both to the primary processing unit and to the secondary processing unit.

17. The method of claim 12 wherein the primary control path receives data from a primary motor vehicle bus, and the secondary control path receives data from a secondary motor vehicle bus which is separate from the primary motor vehicle bus.

18. The method of claim 12 wherein the primary control path and the secondary control path are each connected to an external power supply.

19. The method of claim 12 wherein the primary processing unit is a primary microcontroller (MCU) and the secondary processing unit is a secondary microcontroller (MCU).

* * * * *